July 2, 1963   R. ODELL   3,095,788
SPREADER AND HITCH THEREFOR
Original Filed Sept. 8, 1953   3 Sheets-Sheet 1
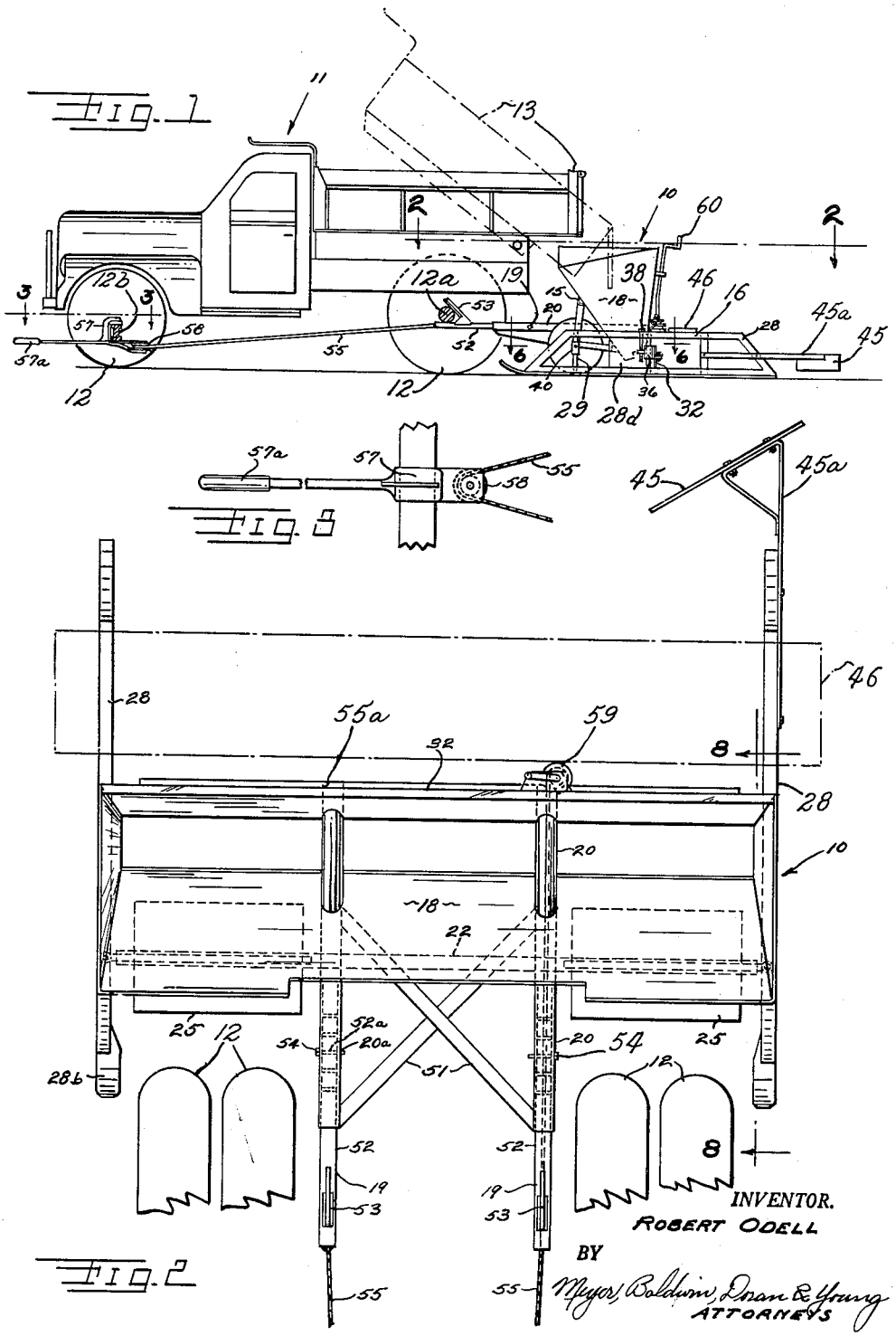
INVENTOR.
ROBERT ODELL
BY
Meyer, Baldwin, Dnan & Young
ATTORNEYS

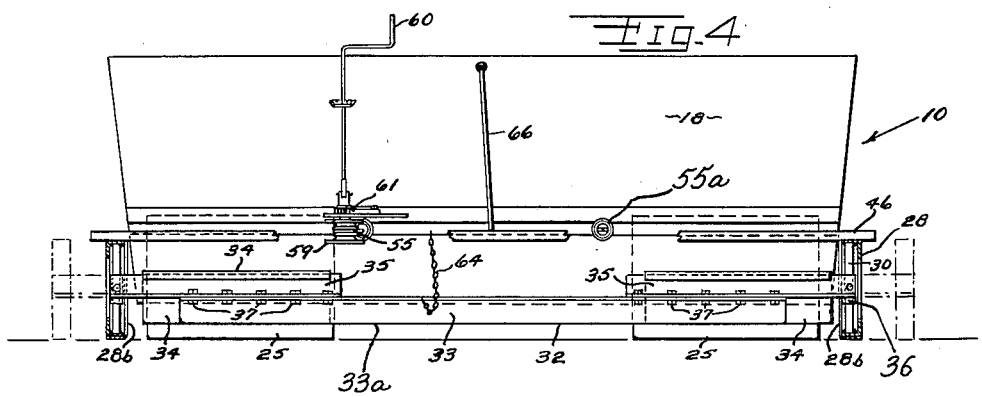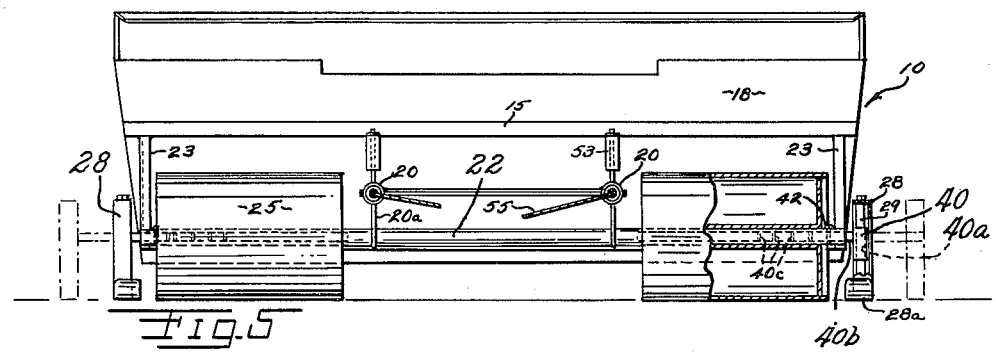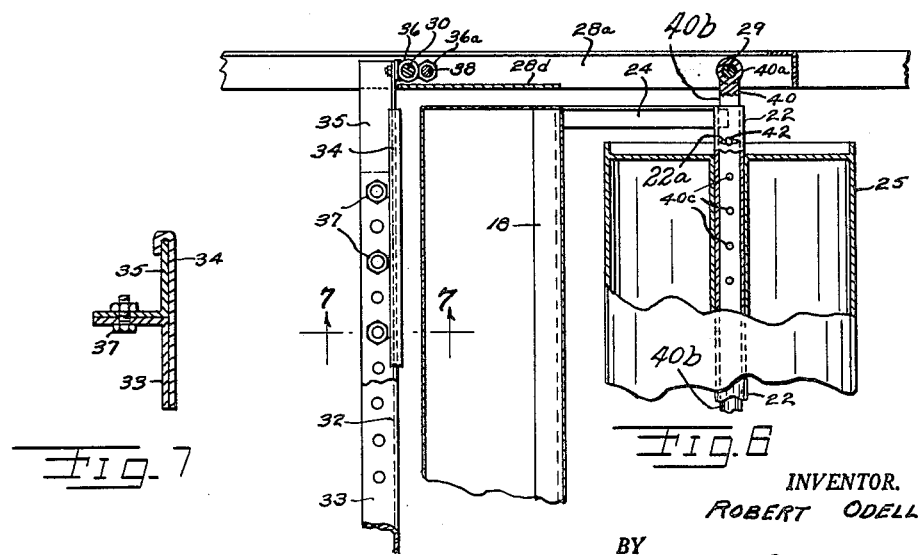

July 2, 1963 R. ODELL 3,095,788
SPREADER AND HITCH THEREFOR
Original Filed Sept. 8, 1953 3 Sheets-Sheet 3

INVENTOR.
ROBERT ODELL
BY
Meyer, Baldwin, Doan & Young
ATTORNEYS

United States Patent Office 3,095,788
Patented July 2, 1963

3,095,788
SPREADER AND HITCH THEREFOR
Robert Odell, Parmelee Drive, Mentor, Ohio
Original application Sept. 8, 1953, Ser. No. 378,834, now Patent No. 2,914,995, dated Dec. 1, 1959. Divided and this application Nov. 23, 1959, Ser. No. 854,738
10 Claims. (Cl. 94—44)

This invention relates to improvements in a spreader and the hitch therefor and more particularly to an asphalt spreader with a hitch connectable to a truck axle.

This application is a division of my copending United States patent application for "Spreader and Hitch Therefor," Serial No. 378,834, filed September 8, 1953, now Patent No. 2,914,995.

One of the objects of the present invention is to provide a material spreader capable of spreading a smooth, uniformly thin layer of material, with this material being preferably asphalt.

Another object of the present invention is to provide a hitch between a spreader and a supplying dump truck with said hitch having a simple structure and being easy to use.

Another object of the present invention is to provide a spreader and/or hitch characterized by structural simplicity, its strong and sturdy nature, and operating efficiency in spreading a smooth and level but uniformly thin layer of material.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a side elevational view in the material spreading position of a dump truck, spreader and hitch for connecting said spreader to the dump truck with the truck dump body shown in solid lines in its carrying position and in dot-dash lines in its dumping position;

FIG. 2 is a top plan view of the spreader and the rear wheels of the dump truck taken along the line 2—2 of FIG. 1;

FIG. 3 is a top plan view taken along the line 3—3 of FIG. 2 showing the front portion of the hitch connected to the front axle of the truck;

FIG. 4 is a rear view of the spreader with the adjustable width runners shown in contracted position by the solid lines and in laterally extended position by the dot-dash lines and with the operator's platform partially broken away for clarity;

FIG. 5 is a front view of the spreader with the roller and runner on the right-hand side thereof broken away to show details thereof;

FIG. 6 is a horizontal sectional view through the spreader taken along the line 6—6 of FIG. 1;

FIG. 7 is a vertical sectional view taken along the line 7—7 of FIG. 6 through the strikeoff plate and gate for dispensing asphalt to fill in between spread strips;

FIG. 9 is an enlarged perspective rear view of one end of the strikeoff plate; while

Figure 8:
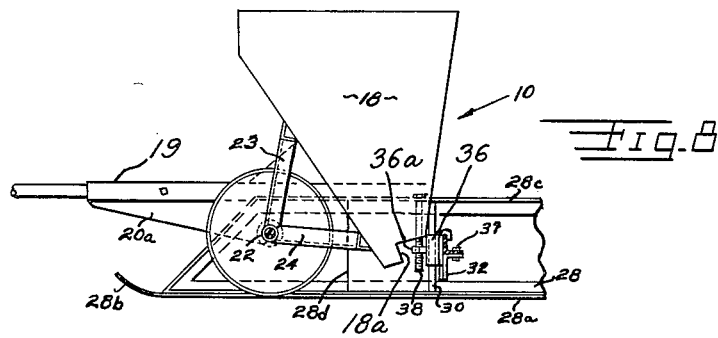
FIG. 8 is a vertical longitudinal sectional view taken along the line 8—8 of FIG. 2 facing the side of the hopper just inside one of the side rails.

Before the spreader and hitch here illustrated is specifically described, it is to be understood that the invention here involved is not limited to the structural details or arrangement of parts here shown since spreaders or hitches embodying the present invention may take various forms. It is also to be understood that the terminology herein employed is for purposes of description and not of limitation since the scope of the present invention is denoted by the appended claims.

Those familiar with this art will recognize that this invention may be applied in many ways. However, it has been chosen to illustrate the same as a spreader for asphalt, either cold or hot mix. But it should be realized that other materials may also be advantageously spread such as concrete, aggregate, bituminous, etc.

In FIG. 1, the spreader of this invention is generally shown at 10 in its spreading position while hitched to the back of a dump truck 11 with this dump truck having a rear dump body 13 pivotally mounted at the rear on the truck for movement between the carrying position shown in solid lines and the dumping position shown in dot-dash lines for supplying asphalt to the spreader. This truck 11 has wheels 12 serving as rolling support means mounted on rear and front axles 12a and 12b respectively with the spreader 10 hitched to these axles so that its hopper travels directly below the discharge opening of the dump body 13 at the tailgate. Of course, the spreader 10 may be pulled instead by another type of prime mover, such as a tractor, etc.

The asphalt, either hot or cold, can be spread in very thin layer, as little as 1/32 inch thick, with this spreader 10. This layer is generally uniform in thickness so that even though as little asphalt as possible is used, a satisfactory asphalt spreading job results. Of course, if the ground surface has been previously scraped before laying the asphalt, so that the ground surface is level, the top surface of the spread asphalt will be level and smooth. Hence, no depressions in the top surface of the asphalt will be present for water puddles to form at a later date. Many of the advantages of the present invention are obtained by having the spreader formed by two frames with a floating connection between them, one frame 15 having the asphalt supply hopper and the other frame 16 having the smoothing means for generating the smooth top surface of the spread asphalt layer.

An inspection of FIG. 2 of the drawings will quickly reveal that generally speaking the spreader is symmetrical about its longitudinal center line (the center line is vertical in FIG. 2) and that generally each part of the spreader has a corresponding part on the opposite side of this center line with these parts being mirror images of each other and about equidistant from the center line. Therefore, only one part of each pair will be described, but it should be clearly understood that the description applies to the corresponding part on the other side of the center line.

The first frame 15 of the spreader includes a supply hopper 18 located directly below the open tailgate of the dump body 13 to receive the asphalt therefrom, as shown in FIG. 1, with this supply hopper having an open bottom for dispensing the asphalt or other material downwardly onto the ground surface to receive the asphalt layer. This frame 15 includes a hitch means with a pull yoke 19 for connecting this frame 15 in proper position below the tailgate of the dump truck. The pull yoke 19 includes two tubes 20, 20 each secured to and extending through aligned holes in the hopper 18. Each tube 20 in FIG. 2 has a depending flange 20a in FIG. 8 supporting a nonrotatable, hollow axle 22 extending horizontally and transversely across the spreader and fixed to the frame. A vertical brace 23 and a horizontal brace 24 in FIGS. 5, 6 and 8 support opposite ends of the axle for greater rigidity.

The frame 15 with the supply hopper 18 can be transported over the ground surface by spaced rollers 25, 25 rotatably mounted on the hollow axle 22 for ground engagement and for rolling over previously graded earth upon which the asphalt is to be spread. Although these rollers are shown as being hollow in FIGS. 5 and 6, it should be readily understood that they may be weighted by having water, sand, cement or other material in their hollow portions or may be made of solid material, if desired. It should be noted in FIG. 2 that each of the rollers is located directly behind the truck wheels 12 so that the weight of the hopper and rollers will smooth out any ruts created by the truck wheel tires so no elevated ground portions will show through when only a thin layer of asphalt has been spread. Of course, the truck 11 and its wheels 12 may take the form of any type prime mover with rolling support means, including crawler tracks, and the advantages of these strategically placed rollers will still be obtained.

The second frame 16 carries the asphalt surface smoothing means and is towed directly behind the asphalt supply hopper 18 but has a free float relative to the supply hopper frame 15 previously described. This second frame 16 has on opposite sides parallel runners 28, 28 for transporting this second frame 16 over the ground surface with movement independent of the first frame 15. Each runner in FIGS. 1 and 8 is of approximately trapezoidal shape with a bottom rail 28a traveling on a previously graded ground surface and having a flat bottom serving as a ground surface engaging means. Each bottom rail 28a of the runner is located equidistant from but out of the path of the truck wheels 12, as clearly shown in FIG. 2, while the lead edge of each runner is upturned at 28b so that the spreader will smoothly travel over the ground surface not disturbed by truck wheels 12. The remainder of the trapezoidal shape has, in addition to the bottom rail 28a, a top rail 28c with these rails connected at opposite ends by upwardly converging end pieces. In each runner, the top and bottom rails are connected together in FIG. 1 by a front vertical post 29 and a rear vertical post 30.

Figure 9:
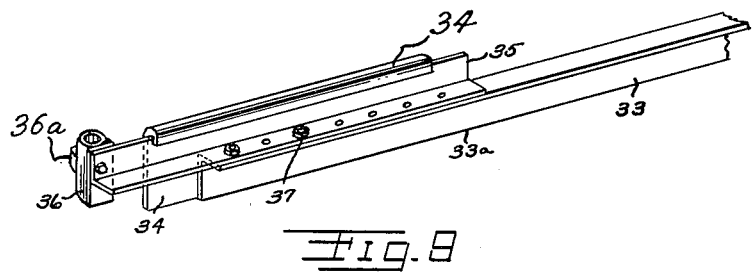

The smoothing means carried by the second frame 16 specifically disclosed in the present application is a strikeoff blade or plate 32 extending transversely between the runners and located directly behind the asphalt supply hopper and its bottom outlet for spreading out the asphalt with a smooth top surface. However, it should be readily understood that the smoothing means may take the form of a roller, screed, gate, rake, or other device capable of performing a smoothing function. This strikeoff blade in FIGS. 4, 6, 7, 8 and 9 specifically consists of a center portion 33 and adjustable end portions 34, 34. This center portion 33 as well as the adjustable end portions 34 in FIG. 9 are supported by end supports 35, 35 detachably connected to the center portion 33 by nut and bolt units 37. It should be noted that both the center portion 33 and the end supports 35 are angle irons with horizontal and vertical flanges so disposed that the horizontal flanges side against each other with the detachable bolt and nut units extending through aligned holes in these horizontal flanges to detachably connect them together.

Adjustable means is provided for securing this smoothing blade 32 to the runners for vertical adjustment to regulate the smooth material thickness. The outer end of each of the end supports 35 is pivotally connected to a tube 36 having a round cylindrical bore therethrough slidable on the cylindrical outer surface of the rear vertical post 30 in FIGS. 1, 6 and 8. Each tube 36 has a projecting ear 36a in FIGS. 8 and 9 threadably secured onto an adjustment screw 38 rotatably mounted in its corresponding top rail 28c but with the adjustment screw 38 fixed against endwise or vertical movement. Hence, vertical adjustment of the smoothing means is provided, and one end of the strikeoff plate 32 can even be lower than the other, if desired, since each end support 35 is pivotally connected to its associated tube 36. However, each screw 38 is loosely mounted in its top rail 28c with a limited amount of lateral movement to provide other float described more in detail hereinafter.

The bottom edge of the strikeoff blade 32 does the actual asphalt smoothing and takes the form of a lower edge 33a on the center portion 33 as well as the corresponding bottom edges on the end portions 34. This bottom asphalt engaging edge can take the form of a straight line, a parabolic curve for forming a crown in the asphalt surface, a bottom edge of any contour but with a downwardly extending projection for cutting a gutter groove along the full length of the asphalt strip, or any other desired contour.

The supply hopper frame 15 and smoothing means frame 16 are operatively connected together by a connecting means between the frame for aligning and towing the smoothing strikeoff blade 32 behind the asphalt supply hopper 18 with free float in all directions.

The strikeoff blade or plate 32 along with the frame 16 is pulled up by the supply hopper frame 15 and has vertical float with respect thereto by a connection between the runners and the transverse axle 22 on which the hopper supporting rollers are mounted. The vertical float is obtained by having on each side a T-fitting 40 with a vertically extending T-crossbar sleeve 40a at the right in FIG. 5 and in FIG. 6 telescoping over the front vertical post 29 of its associated runner 28 to tow frame 16 and to provide the vertical relative movement between the frames.

The frames 15 and 16 can also rotate with respect to each other. The stem of the T-fitting 40 takes the form of a horizontally extending post 40b having a cylindrical outer surface for telescoping within the tubular bore of the hollow axle 22 on which the supply hopper supporting rollers 25 are rotatably mounted. The hollow axle 22, non-rotatably mounted on the supply hopper frame 15, has an arcuate slot 22a therein in FIG. 6 within which a pin 42 freely rides with this pin having its shank extending downwardly through any one of a plurality of axially spaced, diametrical holes 40c in the post 40b and with its head, wider than the arcuate slot 22a, being held above the outer surface of the hollow axle 22 to retain the pin in proper position. Therefore, the frames 15 and 16 can rotate relative to each other about a horizontal, transverse axis coaxial with the hollow axle 22 within the fore-and-aft length of the runners since the tubular post 40b is free to rotate within the hollow axle 22. Arcuate slot 22a permits only the necessary, limited rotational movement needed for proper spreader operation.

The strikeoff blade or plate 32 also has a limited lateral horizontal movement. The strikeoff plate 32 and the runners 28 of the smoothing frame 16 combined with the hollow axle 22 of frame 15 resemble a rectangle. Since each of the four rectangle corners has a pivotal connection formed by the tubes 36 and sleeves 40a rotatably mounted respectively on runner posts 30 and 29, the rectangle is free to change its shape within a limited degree to any form of parallelogram.

It should now be apparent that this spreader will deposit asphalt in a very thin, uniform layer with a level top surface when deposited on a previously graded or otherwise level ground surface because of the floating connection between the independently movable frames 15 and 16 and of the other structural features of the asphalt spreader. This floating connection prevents differences in truck hitch height, the weight of the asphalt load in the supply hopper, and in slight ground irregularities from causing either a wavy surface or depressions in the top of the spread asphalt surface. The floating connection between the frames permits the smoothing frame 16 to travel independently of frame 15 and move only in response to the previously graded, smooth ground surface contour so that a uniform, thin layer of asphalt is deposited. The rise and fall of the hitch means to the truck does not effect the thickness of the layers spread. Also, since the runner rails 28a, 28a travel on the ground surface and not on the top surface of the spread asphalt, the asphalt layer is of approximately uniform thickness. Since each runner bottom rail 28a extends fore-and-aft of the strikeoff blade 32, minor ground surface variation does not materially affect the blade 32 so as to cause either a wavy surface or depressions in the top surface of the asphalt spread. The runner bottom rails 28a, 28a are sufficiently long and the strikeoff blade 32 is located midway between the front and rear ends of each runner so that the runners tend to average out any small depressions and humps in the previously graded earth surface and the strikeoff blade 32 will have a minimum of vertical and lateral disturbance.

The second frame 16 carrying the strikeoff blade 32 is also adjustable as to width since it is frequently necessary to spread a different width strip. Therefore, this smoothing frame 16 has means for adjusting its width so that the strikeoff blade 32 and the ground engaging runners 28, 28 can operate at a narrow or wide width with respect to the hopper supporting frame. The removable pins 42 in FIG. 6 at opposite ends of the roller axle 22 and the plurality of axially spaced diametrical holes 40c in the post 40b permits adjusting the front of the runners 28 to any desired width by merely telescoping the posts 40b within the hollow transverse axle 22. The rear width adjustment can be made by removing the nut and bolt units 37 in FIGS. 4, 6, 7, 8 and 9 so as to adjust the strikeoff blade portions 33 and 34 with respect to each other until the desired width is achieved. Then, bolt and nut units are again inserted into aligned holes in the horizontal flanges, as in FIG. 7, to lock the strikeoff blade or plate portions together with the runners 28, 28 parallel at the desired width.

Since the asphalt is spread only behind the strikeoff blade 32 and between the runners 28, 28 and since the runners travel on the ground surface without any asphalt being spread in their path of travel, it is frequently desirable to match a layer of asphalt being spread with an adjacent strip that has been spread before with the latter having its lateral edge immediately outwardly from one of the runners 28. This is especially true when spreading hot asphalt. Hence, the newly spread strip can be matched with a previously spread strip by depositing loose material in between the strips for blending the two together.

For purposes of illustration, we will assume that this blending is required at the right side of the spreader in FIG. 2 or at the corresponding side in FIG. 4 (the left side) even though blending can be conveniently done on the opposite side. The bottom discharge opening of the asphalt supply hopper 18 has a side opening 18a in FIG. 8 so that some of the asphalt hot mix can flow laterally outwardly against the inner face of the side plates 28d in FIGS. 1 and 6 carried by the runner 28 and this asphalt will flow rearwardly against the left edge of the strikeoff plate 32 in FIG. 4. The adjustable end portion 34 of the strikeoff plate acts as a material flow controller gate then can be slid laterally along the strikeoff plate to control the asphalt flow therethrough since the top of the adjustable end portion 34 in FIG. 9 is folded rearwardly over the vertical flange of the end support 35 to permit endwise movement of the adjustable portion 34 as a flow controller gate, with this gate located between the back of the hopper and the front face of the end support 35 so that the material will not tend to bend or distort the gate. As the spreader moves forwardly and a higher pile of asphalt is permitted to escape at the left edge of the adjustable gate 34, the lute or rake 45 in FIG. 2, having a straight bottom edge, is carried by an arm 45a secured to its runner extends diagonally rearwardly and outwardly over this runner path for blending the presently laid asphalt strip with the previously laid strip by utilizing the extra asphalt material released past the partially open gate 34 since this rake 45 is located behind the gate opening and at the rear of the runner adjoining the previous strip. It should be clear that arm 45a may be made adjustable so as to move the rake 49 to any convenient vertical height, if desired.

It should be noted that the runners 28 are located laterally from the truck wheels 12 so that they travel on the previously graded ground uneffected by the rolling action of the truck wheels 12 and hopper support rollers 25. Also, the hopper support rollers 25 are aligned with and travel directly behind the truck tires 12 so as to roll out any grooves formed thereby so that no raised ground surface will show through even a thin layer of asphalt and the uniform layer of asphalt deposited will have a smooth top surface.

The top rails 28c, 28c of the runners may support a platform in the form of a wooden plank 46 in FIGS. 1 and 4, if desired, so that workmen may ride on the spreader when necessary.

The spreader also includes a hitch means on the supply hopper frame 15 for detachably securing the spreader to the dump truck 11. This hitch means will not only accommodate itself to dump trucks of different types and heights but also is so designed that these differences will not effect the smooth spreading of the asphalt so that a uniformly thick asphalt layer can be spread under all conditions. Of course, this hitch means can be used for attachment between trucks and other types of trailing vehicles, and other types of hitch means could be used with this spreader, but this specific hitch means in combination with the spreader disclosed heretofore has been found to have many advantages resulting from the co-action therebetween so that a better spreading job is obtained.

The specific hitch means disclosed herein for connecting the asphalt supply hopper 18 to the dump truck 11 comprises a pull yoke 19 with a forked abutment 53, cable 55 and hook 57. Yoke 19 consists of hollow tubes 20, 20 in FIG. 2 each secured at its rearward end to the hopper and extending through the hopper walls. Cross braces 51, 51 strengthen the pull yoke by being secured at opposite ends to one of the tubes 20 and to the supply hopper wall 18. A tube 52 is telescoped within and secured to each of the pull yoke tubes 20 in FIG. 2 and has a V-notch 53 at its leading end fitting under, behind and over the rear truck axle 12a in FIGS. 1 and 10.

The supply hopper 18 is adjustable toward and away from the truck 11 so that it can be placed directly under the open tailgate of the dump body 13 on any one of a wide variety of trucks. Each tube 52 is telescoped within the fixed pull yoke tube 20 and a telescoping lock pin 54 is insertible into and removably from a hole 20a in the wall of hollow tube 20 and any one of a plurality of axially spaced diametrical holes 52a in the inner tube 52.

Each V-notch is kept securely nested on the rear truck axle 12a by a securing means. A cable or chain 55 is fixed at one end 55a in FIG. 2 behind the asphalt supply hopper in FIG. 4 by an enlargement preventing it from traveling forwardly through the pull yoke. Then, the cable extends forwardly through the hollow pull yoke tubes 20 and 52 on the left in FIG. 2, forwardly under the truck body in FIG. 1, around a pulley 58 in FIG. 3 on a front axle hook 57, and rearwardly back through the pull yoke tubes 52 and 20 on the right in FIG. 2 to a winch type cable drum 59 in FIGS. 1, 2 and 4 located on the back face of the supply hopper 18 to serve as a take-up means for eliminating slack in the cables by manual rotation of the handle 60 and a conventional ratchet and pawl arrangement to prevent release of the take-up until desired.

No special attachments are needed to secure this spreader 10 to any conventional type of dump truck. After the operator decides that he wants to secure the spreader to the dump truck, he merely pays out some of the cable 55 by unwinding it from the winch cable drum 59, and pulls the cable taut with the hook 57 located directly in front of the spreader hopper 18. Then, the dump truck 11 is backed over the cable 55 until the rear axle 12a in FIG. 1 has entered the V-notches 53. Then, the operator lifts the front axle hook by its convenient extension handle 57a into securement with the front axle 12b. Rotating the winch handle 60 will eliminate the slack in the cable 55 so that the spreader is then ready for use.

This cable or chain 55 is designed with just the proper stretch so that (1) when the truck 11 is pulling the spreader 10 forwardly during spreader operation, the V-notches 53 will stay nested around the rear taruck axle 12a; (2) the supply hopper frame 15 and the rear truck axle 12a can move vertically relative to each other by stretching cable 55 (extending under rear axle 12a) as one or both encounter bumps or other irregularities; (3) the weight of the hopper 18 and of rollers 25 combined with the tension on cable 55 is sufficient to pull the spreader downwardly to roll out any ruts in the ground surface cause by the truck wheels 12 and to cause the spreader to ride better over the ground surface; and (4) the spreader 10 in FIG. 10 may be raised to its carrying position by stretching the cable 55 extending under rear axle 12a.

Figure 10:
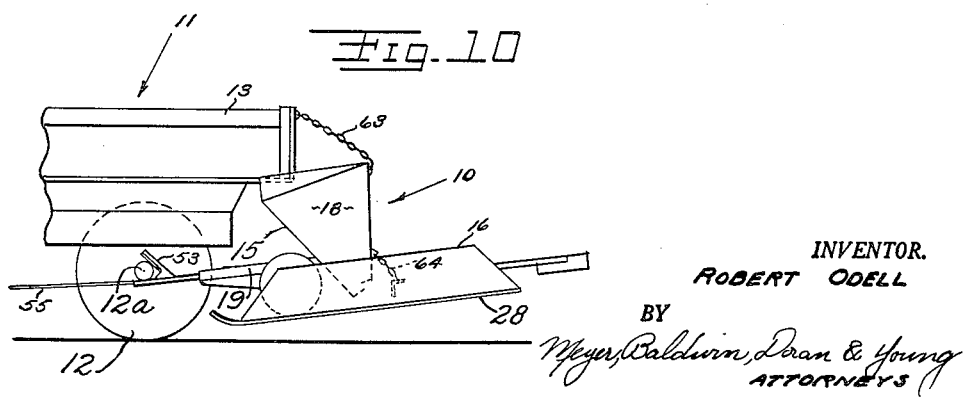
FIG. 10 is a side elevational view like FIG. 1 but showing the spreader in the elevated position for carrying.

This raising operation can be performed by connecting chain 63 in FIG. 10 between the back edge of the supply hopper 18 and the tailgate of the dump body 13 when the dump body is in the dumping position shown by the dot-dash line position in FIG. 1. Then, as the dump body 13 pivots to the horizontal carrying position shown in FIG. 10, the spreader will raise out of ground engagement into carrying position because the V-notches 53 act as pivots about the rear truck axle 12a and the cable 55 has sufficient stretch.

Any convenient means may be provided for connecting the first and second frames 15 and 16 together so that after the hopper 18 of the first frame 15 has begun to raise off of the ground, as shown in FIG. 10, the second frame 16 will also be raised in spite of the floating or loose connection between the frames. This takes the form in the present disclosure of a chain 64, normally slack during the spreading operation in FIG. 4 so that the frames can have free float relative to each other, but serving as a lost motion connection between the frames to lift the smoothing frame 16 as the supply hopper frame 15 is raised by the truck dump body 13 in the manner shown in FIG. 10.

The center of gravity of supply hopper frame 15 is behind the transverse axle 22; and at the time of attaching the spreader to the truck axle, the hopper may have rocked downwardly and have elevated the V-notch 53 upwardly to a position inconvenient to straddle the truck axle. To more conveniently position the V-notch, a rod 66 FIG. 4 is pivoted at its upper end to the back of the supply hopper, and may be swung manually so that its lower end engages the plank 46 on the runner frame.

The rod 66 is of chosen length and acts as a strut to hold the hopper up, and hold the V-notch down at the correct elevation for the truck axle to enter it when the truck is backed up as described. The rod 66 can thereafter be swung aside and free the hopper.

Various changes in details and arrangements of parts can be made by one skilled in the art without departing from either the spirit of this invention or the scope of the appended claims.

What I claim is:
1. In combination, a truck having a rear dump body and a spreader including a hopper positioned below the dump body discharge point for receiving material dumped thereby and for smoothly spreading this material over the ground behind said hopper, and a hitch means connecting said hopper and truck comprising a pull yoke secured to said hopper and having a forked abutment at its leading edge engaging a trailing surface of the rear truck axle, said hitch means comprising a resilient cable extending forwardly under the truck and below the rear axle and having a hook at its forward extremity detachably engaged with the front axle of said truck so that the resiliency of said cable pulls said forked abutment against the rear truck axle by the stretch in said cable and urges said hopper down toward the ground by the tension in said cable exerting a pulling force below the rear axle and pivoting the forked abutment about the rear axle to urge the hopper downwardly so that said resiliency urges the hopper into ground contact but permits vertical relative movement between said hopper and truck to allow for variations in contour of said ground and urges said hopper down against the ground to help smooth the ground before the material is spread thereon.

2. In combination, a truck having a rear dump body and a spreader including a hopper positioned below the dump body discharge point for receiving material dumped thereby and for smoothly spreading this material over the ground behind said hopper, and a hitch means connecting said hopper and truck comprising a pull yoke secured to said hopper and having a forked abutment at its leading edge forwardly opening and engaging a trailing surface of the rear truck axle, said hitch means comprising a cable extending forward under and between the truck axles and having a hook at its forward extremity detachably engaged with the front axle of said truck and comprising take-up means for pulling in slack in said cable and for resiliently pulling said forwardly opening forked abutment against the rear truck axle by the stretch in said cable for controlling the tension in said cable by said take-up means and by the stretch in said cable between said axles.

3. A combination, as set forth in claim 2, with said hitch having an extension handle on said hook permitting the hook to be hooked over the front axle while the handle extends under and below the front bumper, a forwardly opening V notch at its leading edge engaged with the rear truck axle, said hitch including adjustment means adjustably connecting said V notch and leading edge for permitting manual adjustment of the distance between said V notch and said hopper for positioning said hopper below said dump body, and connecting means detachably connectable between said hopper and dump body for raising said spreader out of ground engagement as the dump body moves from dumping to carrying position while said notch acts as a pivot about said axle and said cable is stretched, said cable extending from the hook at said front axle under said rear axle to said spreader hopper, said take-up means being constructed to control the tension in said cable so that the tension in said cable can be maintained constant after change in the distance between said V notch and hopper by manipulation of said adjustment means, said cable being sufficiently resilient so that the V notch is held engaged with the rear truck axle and the spreader and truck may move vertically relative to each other by stretching or slackening said cable while the truck pulls the spreader, said cable having tension exerting a pulling force below the rear axle pivoting the V notch about the rear axle and pulling the spreader down toward the ground by pivoting the V notch about the rear axle to provide a ground smoothing action so as to do better quality spreading by assuring that the ground will not show through the spread material but said cable having sufficient resiliency to said dump body to raise said spreader by said connecting means by stretching the cable extending under said rear axle, said spreader including a material smoothing means located behind and movable independently of said hopper and in response to the ground contour to provide good quality spreading action.

4. In combination, a truck having a rear dump body pivotally mounted thereon for movement between carrying and dumping positions and a spreader including a hopper positioned below the dump body discharge point for receiving material dumped thereby and for smoothly spreading this material over the ground behind said hopper, a hitch means connecting said hopper and truck comprising a pull yoke secured to said hopper and having a forked abutment at its leading edge engaging a trailing surface of the rear truck axle, said hitch means comprising a cable extending forward under the truck and below the rear axle and having a hook at its forward extremity engageable with the front axle of said truck for urging the spreader toward the ground to smooth the ground, and means detachably connected between said hopper and dump body for raising said spreader out of ground engagement by the movement of the dump body to said carrying position while said forked abutment pivots about said rear axle and said cable is stretched by extending under said rear axle so that the resiliency of said cable urges said spreader down toward the ground to securely hold said spreader in carrying position and to direct its movement toward the ground when moved toward ground contact by the dump body.

5. In combination, a truck having a rear dump body mounted thereon for movement between carrying and dumping positions and a spreader including a hopper positionable below the dump body discharge point for receiving material dumped thereby and for smoothly spreading the material over the ground behind said hopper, and a hitch means connecting said hopper and truck comprising a pull yoke secured to said hopper and having a forked abutment at its leading edge engaging the rear truck axle, a cable extending forwardly from said forked abutment under and between the truck axles and having a hook at its forward extremity engaged with the front axle of said truck for resiliently pulling said forwardly opening forked abutment against the rear truck axle by the stretch in said cable, telescopic tubes connected one to said hopper and one to said forked abutment, one of said tubes having a plurality of axially spaced transverse holes, and a pin engageable with any of said holes and an abutment on the other of said tubes so that said forked abutment is adjustable toward and away from the hopper for positioning said hopper below said dump body independently of the distance between said rear axle and the discharge end of said dump body.

6. A combination, as set forth in claim 5, with a cable winch on said hopper connected to said cable for resiliently pulling in slack in said cable.

7. A hitch secured to a spreader having a hopper for connecting said spreader to a truck having rear and front axles and having a rear dump body with the hopper positioned below the dump body discharge point for receiving material dumped thereby, said hitch comprising a pull yoke secured to said hopper and having a forked abutment at its leading edge forwardly opening and engageable with a trailing surface of the rear truck axle, a cable extendable forward under the truck and under the truck rear axle and having a hook at its forward extremity engageable with the front axle of said truck, take-up means for eliminating slack in said cable and for resiliently pulling said forwardly opening forked abutment against the rear truck axle by the stretch in said cable for controlling the tension in said cable by said take-up means and by the stretch in said cable between said axles, said fork abutment including a forwardly opening V notch at its leading edge engageable with a trailing surface of the rear truck axle, adjustment means adjustably connecting said V notch and leading edge for permitting manual adjustment of the distance between said V notch and said hopper so as to position said hopper below said dump body, and means detachably connected between said hopper and dump body for raising said spreader out of ground engagement as the dump body moves from dumping to carrying position while said notch acts as a pivot about said rear axle and said cable is stretched.

8. A hitch secured to a trailer, such as a spreader, for connecting said trailer to a truck having front and rear axles, said hitch comprising a pull yoke secured to said trailer and having a forked abutment at its leading edge forwardly opening and engageable with a trailing surface of the rear truck axle, a cable extendable forward under the truck and below the rear axle and having a hook at its forward extremity detachably engageable with the front axle of said truck, adjustment means adjustably connecting said leading edge for relative movement toward and away from said trailer so as to position said trailer any given distance from said truck, and take-up means for eliminating slack in said cable and for pulling said forwardly opening edge toward said rear axle by said cable extending from the hook at said front axle under said rear axle to said trailer, said take-up means being constructed to control the tension in said cable so that the tension in said cable can be maintained constant after change in the distance between said forked abutment and trailer by manipulation of said adjustment means, the forked abutment will be held engaged with the rear truck axle and the trailer and truck may move vertically relative to each other by stretching or slackening said cable while the truck pulls the trailer, and the tension in the cable extending under the rear axle pulls the trailer down toward the ground by the tension in said cable pivoting the forked abutment about the rear axle.

9. In combination, a truck, a trailer, and a hitch means connecting said trailer and truck comprising a pull yoke secured to said trailer and having a forked abutment at its leading edge forwardly opening and engaging a trailing surface of the rear truck axle, said hitch means comprising a cable extending forward under the truck and below the rear axle and having a hook at its forward extremity detachably engageable with the front axle of said truck and comprising take-up means for eliminating slack in said cable and for pulling said forwardly opening forked abutment toward said rear axle so that forked abutment will be held engaged with the rear truck axle and the trailer and truck may move vertically relative to each other by stretching or slackening said cable while the truck pulls the trailer, and the tension in the cable extending under the rear axle pulls the trailer down toward the ground by the tension in said cable pivoting the forked abutment about the rear axle.

10. In combination, a truck having a rear dump body and a spreader including a hopper positioned below the dump body discharge point for receiving material dumped thereby and for smoothly spreading this material over the ground behind said hopper, and a hitch means connecting said hopper and truck comprising a pull yoke secured to said hopper and having a V-notched forked yoke at its leading edge forwardly opening and engaging a trailing surface of the rear truck axle, said hitch means comprising a cable extending forward under and between the truck axles and having a hook at its forward extremity detachably engaged with the front axle of said truck, and a cable winch on said hopper for pulling in slack in said cable and for resiliently pulling said forwardly opening V-notched forked yoke against the rear truck axle by the stretch in said cable for controlling the tension in said cable by said cable winch take-up means and by the stretch in said cable between said axles, so that raising and lowering of said spreader by said forked yoke pivoting about said rear axle is controlled by the tension in said cable.

References Cited in the file of this patent
UNITED STATES PATENTS

| | | |
|---|---|---|
| 1,457,928 | Johnson | June 5, 1923 |
| 2,205,151 | Partin | June 18, 1940 |
| 2,296,858 | Larison | Sept. 29, 1942 |
| 2,403,820 | Miller | July 9, 1946 |
| 2,417,871 | Heuerman | Mar. 25, 1947 |
| 2,500,064 | Foster | Mar. 7, 1950 |